US 6,699,617 B2

(12) United States Patent
Ebihara et al.

(10) Patent No.: US 6,699,617 B2
(45) Date of Patent: Mar. 2, 2004

(54) ALKALINE STORAGE BATTERY, HYDROGEN-ABSORBING ALLOY ELECTRODE AND METHOD FOR PRODUCING THE SAME

(75) Inventors: Takashi Ebihara, Kamakura (JP); Susumu Kikuyama, Kamakura (JP); Akiko Miyahara, Chigasaki (JP); Xianglong Wang, Atsugi (JP); Kohji Yuasa, Chigasaki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 101 days.

(21) Appl. No.: 09/939,623

(22) Filed: Aug. 28, 2001

(65) Prior Publication Data

US 2002/0051908 A1 May 2, 2002

Related U.S. Application Data

(62) Division of application No. 09/234,300, filed on Jan. 21, 1999, now Pat. No. 6,331,367.

(30) Foreign Application Priority Data

Sep. 11, 1998 (JP) ............................................ 10-276448

(51) Int. Cl.[7] .......................... H01M 4/52; C22F 1/10; C01F 17/00
(52) U.S. Cl. .................... 429/218.2; 429/223; 148/513; 423/21.1; 423/263
(58) Field of Search ................................ 429/218.2, 223, 429/206; 148/513; 423/21.1, 263

(56) References Cited

U.S. PATENT DOCUMENTS 4,837,119 A * 6/1989 Ikoma et al.
5,077,149 A * 12/1991 Ikoma et al. ................ 429/101
5,393,616 A   2/1995 Mori et al.
5,429,724 A * 7/1995 Greenberg
5,506,070 A   4/1996 Mori et al.
5,506,076 A   4/1996 Miyamoto et al.
5,554,571 A * 9/1996 Okabe et al.
5,688,341 A   11/1997 Isono et al.
5,700,596 A * 12/1997 Ikoma et al. ................ 429/206

(List continued on next page.)

FOREIGN PATENT DOCUMENTS

| EP | 266162 | 5/1988 |
| EP | 0271043 | 6/1988 |
| EP | 0696823 | 2/1996 |
| EP | 0851520 A2 * | 7/1998 |
| JP | 53033332 | 3/1978 |

(List continued on next page.)

OTHER PUBLICATIONS

US 2002/0051908 A1 Ebihara et al. (May 2, 2002).*
US 2001/0054458 A1 Kikuyama et al. (Dec. 27, 2001).*

(List continued on next page.)

*Primary Examiner*—Kiley Stoner
(74) *Attorney, Agent, or Firm*—Stevens, Davis,Miller & Mosher, LLP (57) ABSTRACT

The present invention provides an alkaline storage battery excellent in high-rate charge and discharge characteristics, and a hydrogen-absorbing alloy electrode suitable for the battery and a method for producing the same. The hydrogen-absorbing alloy is preferably produced by wet grinding in water a hydrogen-absorbing alloy having at least one rare earth element, nickel and at least one transition metal element, treating the resulting alloy powders in an aqueous alkali solution, and then consecutively treating the powders in an acidic aqueous solution. The hydrogen-absorbing alloy powders have a structure of a nickel-condensed layer being exposed and have many pores.

8 Claims, 4 Drawing Sheets

U.S. PATENT DOCUMENTS

| | | | |
|---|---|---|---|
| 5,707,764 A | | 1/1998 | Miyamoto et al. |
| 5,804,334 A | | 9/1998 | Yamamura et al. |
| 5,858,571 A | * | 1/1999 | Ishii et al. |
| 5,864,072 A | * | 1/1999 | Kobayashi et al. ............ 75/246 |
| 5,932,034 A | * | 8/1999 | Ishii et al. |
| 5,935,732 A | | 8/1999 | Matsumura et al. |
| 5,962,165 A | | 10/1999 | Tsuruta et al. |
| 5,980,841 A | * | 11/1999 | Yamamoto ................. 423/21.1 |
| 6,030,724 A | | 2/2000 | Sawa et al. |
| 6,040,087 A | | 3/2000 | Kawakami |
| 6,068,948 A | | 5/2000 | Imoto et al. |
| 6,071,644 A | * | 6/2000 | Ikemachi et al. |
| 6,096,144 A | * | 8/2000 | Ishii et al. |
| 6,110,304 A | * | 8/2000 | Nogami et al. |
| 6,136,473 A | * | 10/2000 | Furukawa et al. |
| 6,153,334 A | * | 11/2000 | Sakamoto et al. |
| 6,268,083 B1 | * | 7/2001 | Iida et al. |
| 6,300,010 B1 | * | 10/2001 | Nakano et al. |
| 6,322,926 B1 | * | 11/2001 | Kasashima et al. |
| 6,329,101 B1 | * | 12/2001 | Kawakami |
| 6,331,367 B1 | * | 12/2001 | Ebihara et al. |

FOREIGN PATENT DOCUMENTS

| | | |
|---|---|---|
| JP | 61285658 | 12/1986 |
| JP | 63314764 | 3/1988 |
| JP | 09007588 | 1/1997 |
| JP | 09007591 | 1/1997 |
| JP | WO 9712408 | 4/1997 |
| JP | 09171821 | 6/1997 |
| JP | 09204914 | 8/1997 |
| JP | 62249358 | 10/1997 |
| JP | 409259871 | 10/1997 |
| JP | 411339793 | 12/1999 |
| JP | 2000090920 | 3/2000 |

OTHER PUBLICATIONS

Patent Abstracts of Japan vol. 1997, No. –, Oct. 31, 1997 & JP 09 171821 A (Toyota Autom Loom Worksltd), Jun. 30, 1997.

European Search Report dated Oct. 7, 1999.

* cited by examiner

ALKALINE STORAGE BATTERY, HYDROGEN-ABSORBING ALLOY ELECTRODE AND METHOD FOR PRODUCING THE SAME

This is a division of application Ser. No. 09/234,300 U.S. Pat. No. 6,331,367, filed Jan. 21, 1999.

BACKGROUND OF THE INVENTION

1. Field of the Invention

The present invention relates to an alkaline storage battery, a hydrogen-absorbing alloy electrode, and a method for producing the same.

2. Description of Related Art

Nickel-metal hydride storage batteries practically made using hydrogen-absorbing alloys have the characteristics such as low environmental pollution and high energy density. The batteries are being widely used as electric sources of various cordless equipment and electronic equipment. Furthermore, for the use as power sources of electric vehicles, it is strongly expected to increase the output by improving the high-rate discharge characteristics.

As materials of negative electrodes for nickel-metal hydride storage batteries, generally used are $MmNi_5$ (Mm denotes a mixture of rare earth elements) alloys having a crystal structure of $CaCu_5$ type in which a part of Ni is replaced with a metal such as Co, Mn, Al or Cu.

In such hydrogen-absorbing alloy powders, an oxide or hydroxide is formed on the surface owing to spontaneous oxidation. Therefore, the initial charge and discharge capacity as an electrode lowers and activation is needed.

Moreover, the elements such as Mn and Al which perform an important part in hydrogen absorption/release equilibrium pressure of hydrogen-absorbing alloys and life of batteries readily dissolve into alkaline electrolyte and precipitate as an oxide or hydroxide. The dissolution and precipitation of these elements cause reduction in alloy capacity and deteriorate cycle life.

In addition, rare earth elements precipitate as hydroxides and cover the alloy surface. As a result, electrical conductivity decreases and charge and discharge characteristics at high-rate are insufficient.

As a conventional method for enhancing activation of hydrogen-absorbing alloys, JP-A-61-285658 discloses to immerse hydrogen-absorbing alloys in an alkaline aqueous solution. JP-A-9-7591 and JP-A-9-171821 disclose methods of immersing hydrogen-absorbing alloys in an alkaline aqueous solution and then in an acidic aqueous solution.

According to the former method of treating the hydrogen-absorbing alloys with an alkaline aqueous solution, the metal components such as Al and Mn and oxide films which are present on the surface of the hydrogen-absorbing alloy powder and which are soluble in an alkaline aqueous solution are dissolved. The dissolution forms on the surface of hydrogen-absorbing alloys a nickel-condensed layer (nickel-rich layer) which is higher in nickel concentration than other portions. In this way, it is attempted to improve activity of hydrogen-absorbing alloys.

According to the latter methods of treating the hydrogen-absorbing alloy with an alkaline aqueous solution and then with an acidic aqueous solution, an insulating hydroxide of low solubility (e.g., $Mm(OH)_3$) produced on the alloy surface by the alkali treatment is dissolved in the acid solution and removed. In this way, it is attempted to improve the activation of the hydrogen-absorbing alloy and obtain a sufficient initial discharge capacity. In these methods, the hydrogen-absorbing alloy is dry ground and a drying step is provided between the steps of alkali treatment and acid treatment.

However, the formation of nickel-condensed layer on the surface of hydrogen-absorbing alloy or the removal of the hydroxide on the surface of the alloy according to the conventional techniques mentioned above cannot provide sufficient high-rate charge and discharge characteristics in the use for electric vehicles or electric tools which are demanded to have a high output.

BRIEF SUMMARY OF THE INVENTION

The main object of the present invention is to provide an alkaline storage battery and hydrogen-absorbing alloy electrode capable of charging and discharging at high-rate by providing many pores on the surface of hydrogen-absorbing alloy to further improve the activity of the alloy in addition to the formation of a nickel-condensed layer on the surface of the hydrogen-absorbing alloy and the removal of hydroxide, and, besides, provide a method for producing the same.

For attaining the above object, in an electrode made using hydrogen-absorbing alloy powders comprising at least one rear earth element, nickel and at least one transition metal element as main components, the present invention uses as the hydrogen-absorbing alloy powders those having a structure of a nickel-condensed layer being exposed at the surface and having many pores.

The above hydrogen-absorbing alloy powders are preferably produced by a method which includes a first step of wet grinding a hydrogen-absorbing alloy, a second step of treating the resulting powder with an alkaline aqueous solution and a third step of treating the powder with an acidic aqueous solution which is carried out in succession to the second step, namely, without a drying step.

DETAILED DESCRIPTION OF THE INVENTION

The first embodiment of the present invention is a hydrogen-absorbing alloy electrode containing hydrogen-absorbing alloy powders wherein said hydrogen-absorbing alloy powders comprise at least one rare earth element, nickel and at least one transition metal element as main components, and the surface portion of the alloy powders has a structure of a nickel-condensed layer being exposed and has many pores. The nickel-condensed layer here means a nickel-rich layer which is higher in nickel concentration than other portions of the hydrogen-absorbing powders.

When a battery is constructed using this electrode, there is provided a sealed nickel-metal hydride storage battery high in initial activity of the hydrogen-absorbing alloy electrode and excellent in charge and discharge characteristics at a large current of 1 CmA or more.

The second embodiment of the present invention relates to an electrode using hydrogen-absorbing alloy powders in which diameter of the pores in the surface portion is mainly 1.5–2.0 nm and which have a specific surface area of 0.5 m$^2$/g or more measured according to BET method and contains 1.7–7.0% by weight of a magnetic material in terms of nickel.

It is presumed that the pores are formed in the following manner: There are unavoidable segregation phase portions where a Mish metal and Mn are concentrically present in the hydrogen-absorbing alloy. The segregation phase portions present in the surface portion of the hydrogen-absorbing alloy are etched by the acid treatment after the treatment with an alkaline aqueous solution and as a result the pores are formed.

Distribution of pore diameter in the alloy is affected by solidification rate at the preparation of alloy. When alloys prepared by casting method using a water-cooled mold, atomizing method, melt spinning method or the like are used, those having a pore diameter of 1.5–2.0 nm are obtained and the resulting electrode is excellent in high-rate charge and discharge characteristics.

The specific surface area of the alloy powders measured by BET method is preferably 0.5 m$^2$/g or more. This is because if the specific surface area is less than 0.5 m$^2$/g, internal pressure during charging increases or high-rate discharge characteristics are insufficient. The specific surface area is more preferably 0.6 m$^2$/g or more.

The content of magnetic material, namely an indication of the amount of the nickel-condensed layer in the alloy is preferably 1.7–7.0% by weight in terms of nickel. The content of magnetic material can be controlled by the acid treating temperature and time. If it is less than 1.7% by weight, initial absorbing and releasing of hydrogen of the alloy are insufficient and the alloy is inferior in initial activity. If it is more than 7.0% by weight, the initial activity and the high-rate charge and discharge characteristics are improved, but with increase of the content, the absorption and release amount of hydrogen decreases. The content of magnetic material is more preferably 2.0–5.0% by weight.

Content of pores having a pore diameter of 1.5–2.0 nm in the surface portion of the alloy powders is preferably $1.5 \times 10^{-3}$–$4.0 \times 10^{-3}$ CC per 1 g of the alloy powders. The content of the pores is more preferably $2.6 \times 10^{-3}$–$3.5 \times 10^{-3}$ CC.

The third embodiment of the present invention relates to a hydrogen-absorbing alloy electrode comprising the hydrogen-absorbing alloy powders of the first and the second embodiments to which 1–5% by weight of nickel powders based on the alloy powders are added. According to this embodiment, the high-rate charge and discharge characteristics are further improved. It is considered that this is because the electrical conductivity between the alloy powders is improved. The effect is conspicuous with addition of 1% by weight or more of nickel powders. If the nickel powders are added in an amount of more than 5% by weight, amount of the alloy in the same volume must be decreased, resulting in a reverse effect. Therefore, the amount of nickel powders added is preferably 1–5% by weight based on the alloy.

The nickel powders may have any particle diameter, but the particle diameter is preferably smaller than that of the alloy powders, and the smaller particle diameter provides a greater effect.

The fourth embodiment of the present invention relates to a method for producing a hydrogen-absorbing alloy electrode which includes a first step of grinding a hydrogen-absorbing alloy comprising at least one rare earth element, nickel and at least one transition metal element, a second step of treating the resulting powders with an alkaline aqueous solution, and a third step of treating the powder with an acidic aqueous solution which is carried out in succession to the second step. Wet grinding in water or an aqueous solution is preferred.

The fifth embodiment of the present invention relates to a method for producing a hydrogen-absorbing alloy which includes a first step of wet grinding a hydrogen-absorbing alloy comprising at least one rare earth element, nickel and at least one transition metal element, a second step of treating the resulting powders with an alkaline aqueous solution, and a third step of treating the powder with an acidic aqueous solution. The second step and the third step are preferably carried out in succession, namely, without providing a drying step or the like.

The reason for the wet grinding being preferred is that local oxidation of the alloy surface can be inhibited as compared with the case of dry grinding and the subsequent treatment can be more uniformly performed. At the time of grinding, especially the unavoidable segregation phase portions of the alloy surface are apt to undergo the local oxidation. The unavoidable segregation phase portions of the alloy surface are etched by the subsequent acid treatment to form pores, and if the portions are oxidized at the grinding, they are difficult to be etched and the pores are not sufficiently formed.

The reason why it is preferred to carry out the acid treatment in succession to the alkali treatment is as follows. That is, by the alkali treatment and the subsequent acid treatment, there can be obtained a hydrogen-absorbing alloy powders having substantially no hydroxide of the rare earth element in the surface portion of the alloy, having a structure of a nickel-condensed layer being exposed at the alloy surface and having pores. However, if the alloy powders are dried between the alkali treatment and the acid treatment, the nickel-condensed layer formed by the alkali treatment on the surface of alloy powders is oxidized to cause reduction of the amount of the magnetic material which catalytically acts on the alloy surface at the time of electrode reaction. Furthermore, the above-mentioned unavoidable segregation phase portions of the alloy surface are also oxidized by the drying and pores in the alloy surface portion cannot be sufficiently produced to cause deterioration of high rate discharge characteristics. For these reasons, preferably no drying step is provided between the alkali treatment and the acid treatment.

It is preferred that the alkali treatment is carried out at 70–110° C. for 30–120 minutes using an alkaline aqueous solution of 1.20–1.40 in specific gravity.

The purpose of the alkali treatment is dissolution and removal of soluble components in the alloy with the alkaline aqueous solution together with formation of the nickel-condensed layer. The higher concentration of the alkaline aqueous solution, the higher treating temperature and the longer treating time result in more efficient dissolution and removal of the soluble components, and thus formation of the nickel-condensed layer becomes easier to improve the initial activity and the high-rate charge and discharge characteristics. However, the absorption and release amount of hydrogen of the alloy decreases and, hence, the above ranges are preferred.

As the alkaline aqueous solution, effective are all alkaline aqueous solutions such as of potassium hydroxide, sodium hydroxide, lithium hydroxide and the like, or, if necessary, mixtures of these alkaline aqueous solutions can be effectively used.

It is preferred that the acid treatment is carried out at 30–80° C. for 10–60 minutes using an acidic aqueous solution having a pH of 2.0–3.5. If pH is low, since the solution can dissolve all the elements in the hydrogen-absorbing alloy, it cannot selectively etch the segregation phase portions to cause severe corrosion of the alloy. On the other hand, if pH is high, removal of hydroxide on the alloy surface and formation of pores by etching are insufficient. Furthermore, if the treating temperature is low, removal of hydroxide on the alloy surface and formation of pores by etching are insufficient. If the treating temperature is high, the treatment excessively proceeds, and the high-rate charge and discharge characteristics are improved, but the amount of hydrogen of the alloy absorbed and released is decreased. The treating temperature with the acidic aqueous solution is more preferably 40–70° C.

The sixth embodiment of the present invention relates to a method for producing a hydrogen-absorbing alloy electrode which further comprises a fourth step of adjusting pH of a slurry of the alloy powders of the third step of the forth embodiment or the fifth embodiment to 7–13 by the addition of an alkaline aqueous solution.

When pH of the slurry of the alloy powders is adjusted to 7–13 by the addition of an alkaline aqueous solution in succession to the step of acid treatment, viscosity of the paste to which additives and a binder are added is stabilized to make easy the subsequent coating of the paste of the hydrogen-absorbing alloy on a core material and the like.

The seventh embodiment of the present invention relates to an alkaline storage battery constructed of a negative electrode made using hydrogen-absorbing alloy powders comprising at least one rare earth element, nickel and at least one transition metal element as main components, a positive electrode comprising a metal oxide and a separator, in which the surface portion of the alloy powders of the negative electrode has a structure of a nickel-condensed layer being exposed and has many pores. According to this embodiment, an alkaline storage battery excellent in high-rate discharging can be provided. The requirements mentioned above in connection with the first, second and third embodiments can also be applied to the seventh embodiments.

EXAMPLE

Examples of the present invention will be explained below.

Example 1

A hydrogen-absorbing alloy having the composition MmNi$_{3.55}$Mn$_{0.4}$Al$_{0.3}$Co$_{0.75}$ (Mm denotes a mixture of rare earth elements) prepared by casting method using a water-cooled mold was mechanically ground in water so as to give an average particle diameter of 30 μm by a wet ball mill to prepare hydrogen-absorbing alloy powders.

As the step of alkali treatment, the resulting alloy powders were immersed and stirred for 60 minutes in an aqueous potassium hydroxide solution having a specific gravity of 1.30 and heated to 80° C. in the same weight as the alloy powders, followed by washing with water until pH of the washing water reached 10 or less.

Then, as the step of acid treatment, the alloy powders were immersed and stirred for 30 minutes in an aqueous acetic acid solution of pH 3.0 and of 60° C. in the same weight as the alloy powder, followed by washing with water until pH of the washing water reached 6 or more to obtain a slurry of the hydrogen-absorbing alloy powders.

100% by weight of this slurry was mixed with 0.15% by weight of carboxymethylcellulose as a thickening agent, 0.3% by weight of carbon black as a conductive agent, 0.8% by weight of styrene-butadiene copolymer as a binder, and water as a dispersing medium to prepare an alloy paste.

This paste was coated on a core material comprising a punching metal, followed by drying and pressing. Furthermore, a fluorocarbon resin powder was coated on the surface, and therefrom was made a hydrogen-absorbing alloy electrode of 35 mm in width, 150 mm in length and 0.4 mm in thickness and 2200 mAh in capacity.

This was combined with a known sintered nickel positive electrode and a separator of polyolefin nonwoven fabric subjected to sulfonation treatment, and these were spirally rolled to make an electrode plate group. This electrode plate group was inserted in a metallic case, into which was poured a given amount of an electrolyte prepared by dissolving 40 g/l of lithium hydroxide in an aqueous potassium hydroxide solution of 1.30 in specific gravity, followed by sealing this case at the top thereof with a sealing plate to make a sealed nickel-metal hydride storage battery of 4/5A size and 1500 mAh in nominal capacity. This was a battery of Example A1.

Furthermore, a battery was made under the same conditions as in Example A1, except that after the washing with water until the pH of the washing water reached 6 or more in the step of acid treatment, an aqueous potassium hydroxide solution was added so as to give a pH of 9–10. This was a battery of Example A2. A battery was made under the same conditions as in Example A1, except that 2.5% by weight of nickel powders were added to the alloy paste. This was a battery of Example A3.

Moreover, a battery was made under the same conditions as in Example A1, except that the grinding of the alloy was carried out by a dry ball mill. This was a battery of Example A4. Further, a battery was made under the same conditions as in Example A1, except that a drying treatment in the air was carried out after the alkali treatment. This was a battery of Example A5. In addition, as a comparative example, a battery was made under the same conditions as in Example A1, except that the acid treatment was not carried out. This was a battery of Comparative Example B1.

The six batteries of Examples A1–A5 and Comparative Example B1 obtained by the above methods were evaluated on internal pressure and high rate discharge characteristics. The internal pressure was an internal pressure when the battery was charged for 1.2 hour at a current of 1 CmA (CmA: the theoretical capacity of the cell). As for the high-rate discharge characteristics, the battery was subjected to a test of carrying out charging for 1.2 hour at a current of 1 CmA and, after a suspension of 1 hour, carrying out discharging at 5 CmA until the voltage reached 0.8 V, and the high-rate discharge characteristics were evaluated by the average discharge voltage at the time of discharging at 5 CmA and the ratio of discharge capacity to nominal capacity.

Figure 1:
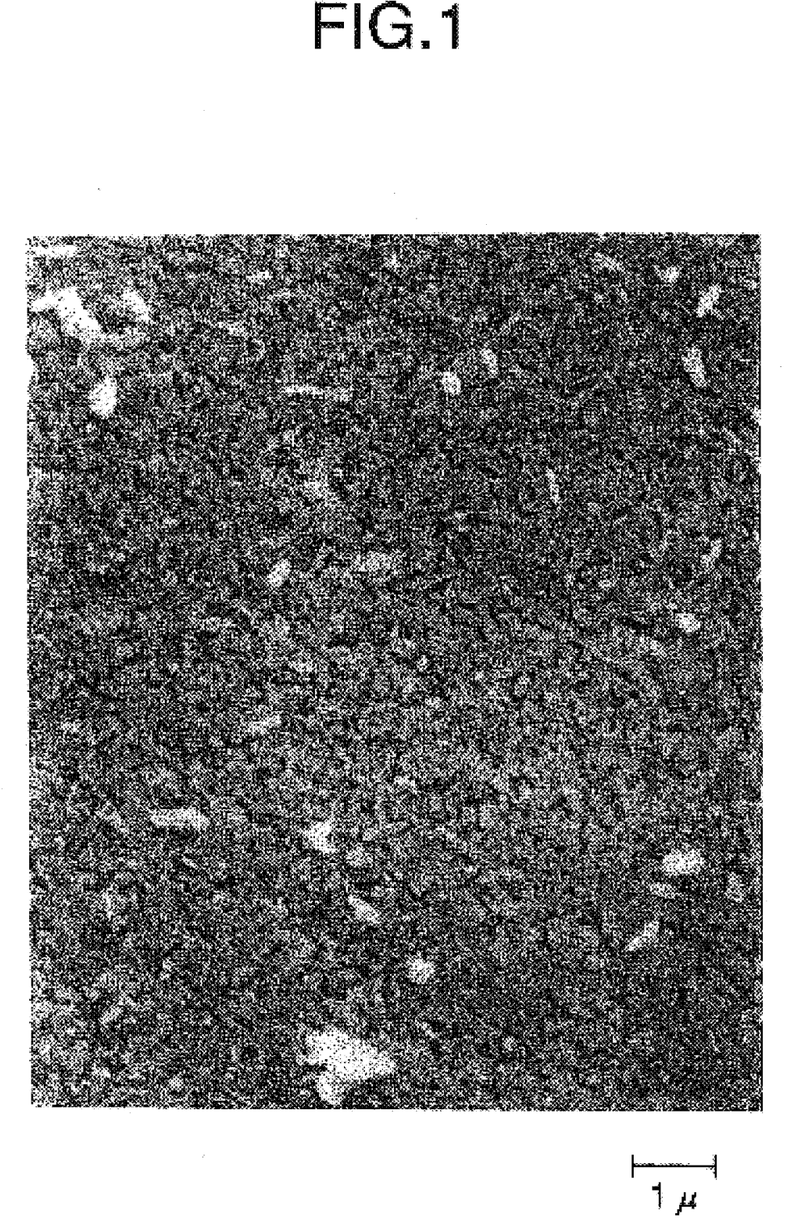
FIG. 1 is a scanning electron microphotograph of the hydrogen-absorbing alloy powders used in Example A1.
Figure 2:
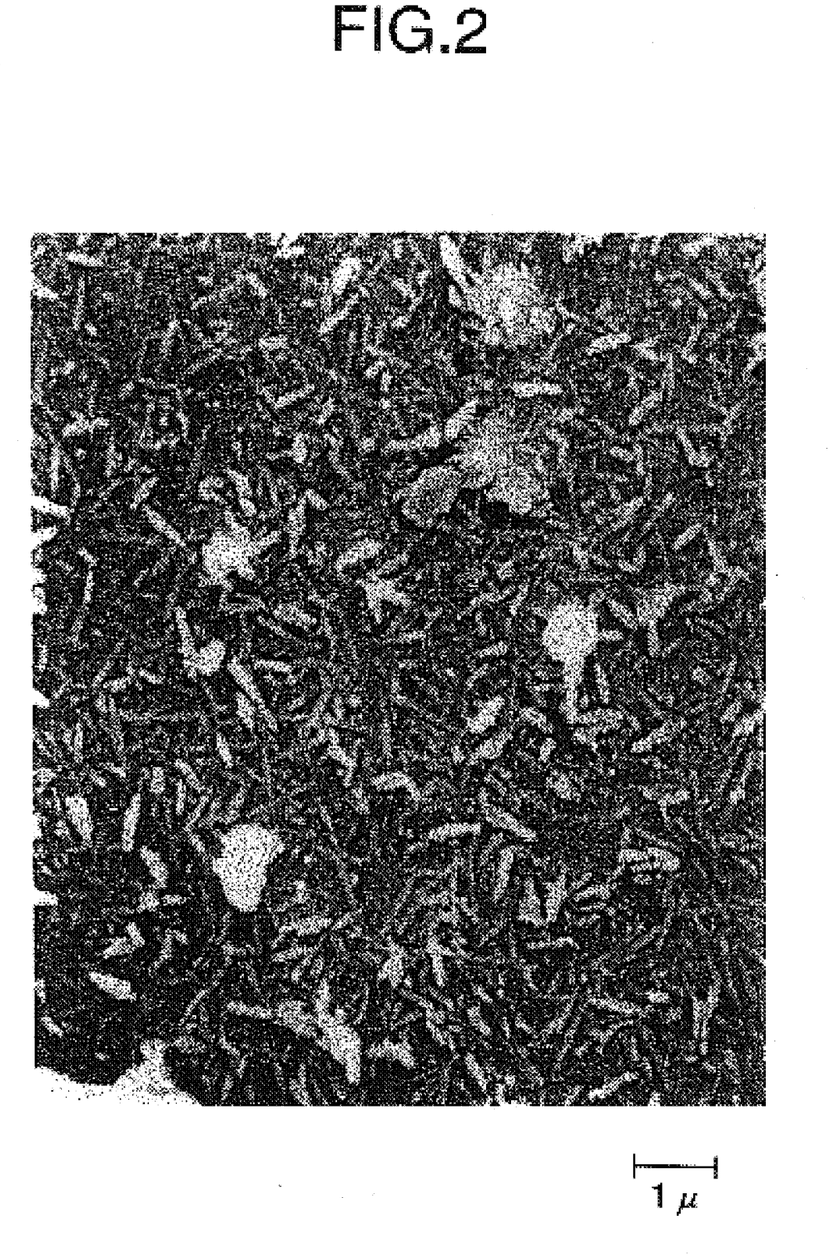
FIG. 2 is a scanning electron microphotograph of the hydrogen-absorbing alloy powders used in Comparative Example B1.

FIG. 1 shows a scanning electron microphotograph of the hydrogen-absorbing alloy powders of Example A1. FIG. 2 shows a scanning electron microphotograph of the hydrogen-absorbing alloy powders of Comparative Example B1. It can be seen that hydroxide of the rare earth element was precipitated in the acicular form on the surface in FIG. 2. This hydroxide of the rare earth element was removed by the acid treatment in FIG. 1.

Figure 3:
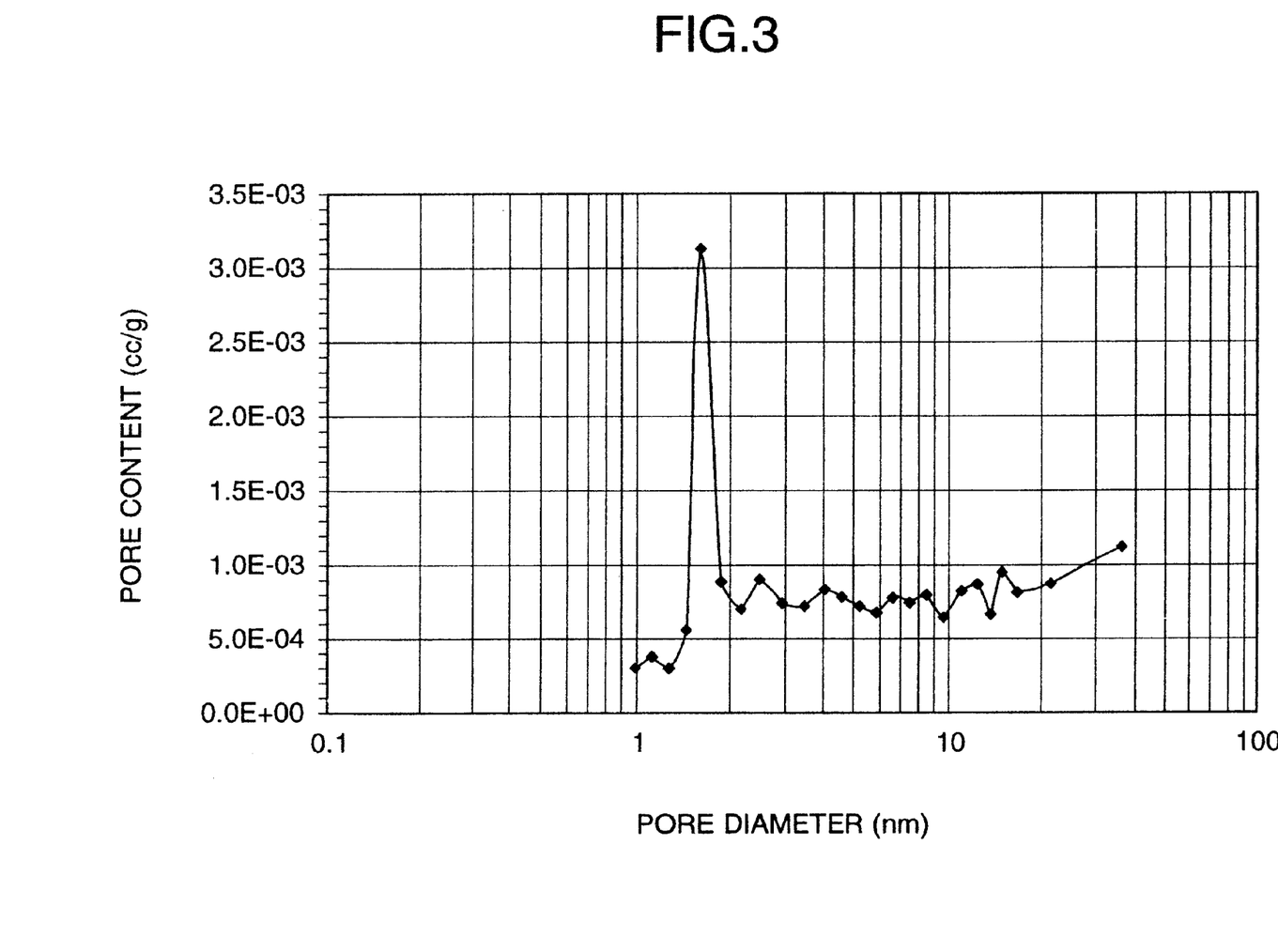
FIG. 3 is a graph showing pore distribution of the hydrogen-absorbing alloy powder used in Example A1 which was measured by BET method.
Figure 4:
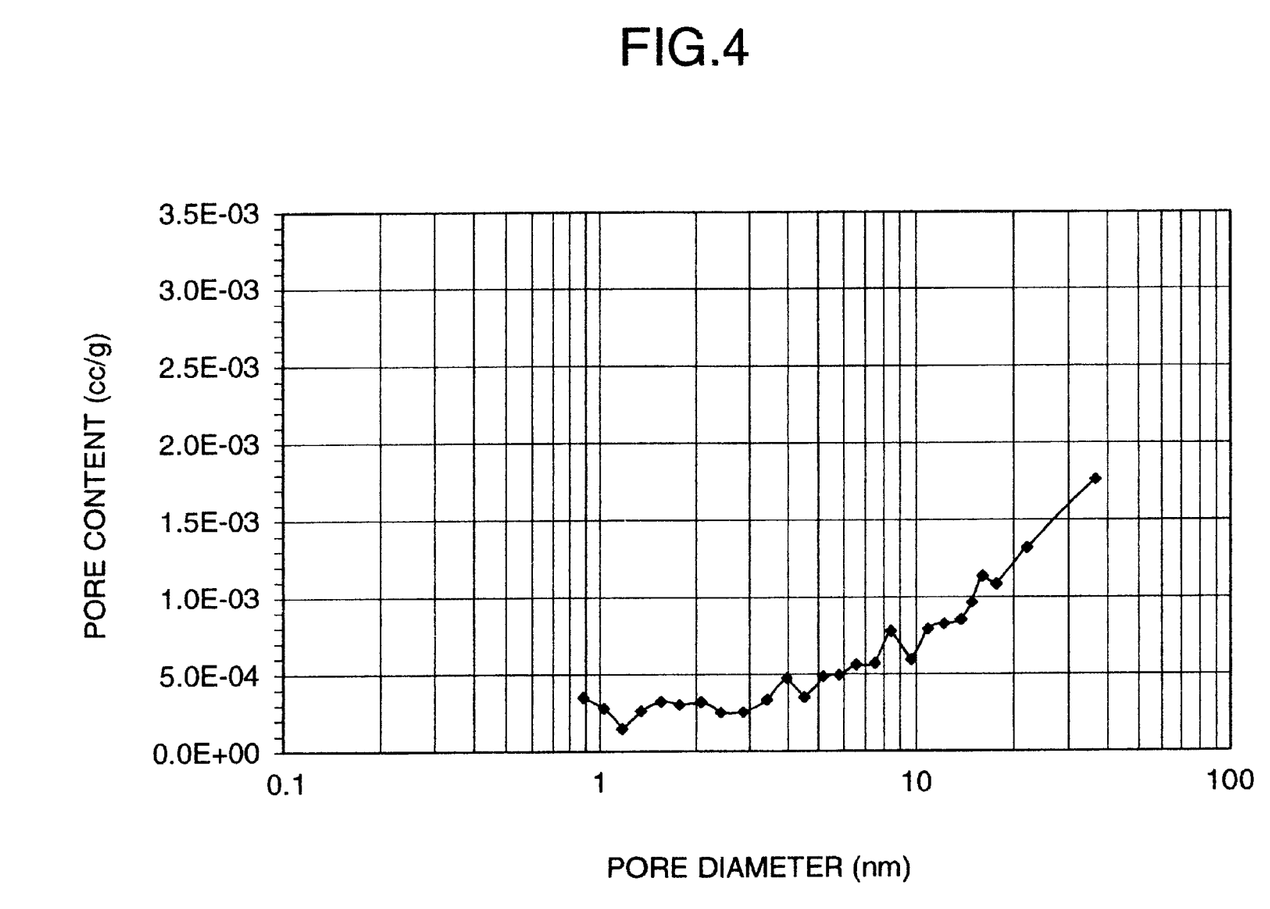
FIG. 4 is a graph showing pore distribution of the hydrogen-absorbing alloy powder used in Comparative Example B1 which was measured by BET method.

FIG. 3 shows pore distribution of the hydrogen-absorbing alloy powders of Example A1 measured by BET method and FIG. 4 shows pore distribution of the hydrogen-absorbing alloy powders of Comparative Example B1.

In FIG. 3 and FIG. 4, a pore content of 0.0E+00–3.5E–03 (0–3.5×10$^{-3}$) cc/g was employed as a range of scale of ordinate axis, and logarithmic scale of a pore diameter of 0.1–100 nm was employed as a range of scale of abscissa axis.

It can be seen from the comparison of FIG. 3 and FIG. 4 that the alloy powders of the present invention had many pores in the powder surface and the pore diameter was mainly 1.5–2.0 nm.

Table 1 shows internal pressure and high-rate discharge characteristics of the six batteries. Furthermore, specific surface area of the alloy powders used, content of pores having a pore diameter of 1.5–2.0 nm per 1 g of the alloy powders, and content of magnetic material in terms of nickel measured by a sample vibratory type magnetometer (VSM) are also shown in Table 1.

TABLE 1

|    | Specific surface area (m$^2$/g) | Pore content (cc/g) | Content of magnetic material (wt %) | Internal pressure (kg/cm$^2$) | High-rate discharge characteristics | |
|----|---------|---------|---------|---------|---------|---------|
|    |         |         |         |         | Discharge voltage (V) | Discharge capacity ratio (%) |
| A1 | 0.62 | 3.1 × 10$^{-3}$ | 3.5 | 4.3 | 1.126 | 94 |
| A2 | 0.61 | 2.8 × 10$^{-3}$ | 3.4 | 4.6 | 1.127 | 95 |
| A3 | 0.62 | 3.1 × 10$^{-3}$ | 3.5 | 3.8 | 1.132 | 97 |
| A4 | 0.52 | 2.4 × 10$^{-3}$ | 2.8 | 5.0 | 1.123 | 91 |
| A5 | 0.48 | 1.7 × 10$^{-3}$ | 2.6 | 6.1 | 1.120 | 90 |
| B1 | 0.40 | 0.3 × 10$^{-3}$ | 1.5 | 8.6 | 1.115 | 84 |

It can be seen from Table 1 that in the case of the larger specific surface area, the larger content of pores having a pore diameter of 1.5–2.0 nm and the larger content of magnetic material in terms of nickel, the internal pressure decreased and the high-rate discharge characteristics were better.

It is presumed that this is because in Example A1 the hydroxide of the rare earth element formed on the alloy surface by the alkali treatment was removed by the acid treatment and besides the alloy had the structure of the nickel-condensed layer being exposed at the alloy surface and had many pores of 1.5–2.0 nm in pore diameter, and, as a result, resistance to the electro-chemical reaction on the alloy surface was lowered.

The battery of Example A2 was the same as that of Example A1 in performances, but the former is industrially effective since viscosity of the paste was stable in the preparation of electrode paste and the subsequent coating of the paste on the core material could be more easily performed than in Example A1.

It can be presumed that this is because the styrene-butadiene copolymer as an additive has the property of being easily coagulated in the acidic region. This effect was effective in the pH region of 7–13 of the alloy powder slurry.

The battery of Example A3 was further improved in battery performances than the battery of Example A1. It is presumed that this is because the nickel powders added to the negative electrode were present between alloy powders, whereby electrical conductivity between alloy powders was improved to accelerate the electrochemical reaction.

The above effect was conspicuous with addition of 1% by weight or more, but when it was added in an amount of more than 5% by weight, the amount of the alloy must be reduced within the same volume, resulting in a reverse effect. Thus, amount of nickel powders is preferably 1–5% by weight based on the weight of alloy.

The batteries of Examples A4 and A5 showed better results than that of Comparative Example B1, but were somewhat inferior to the battery of Example A1 in performances.

This is because Example A4 and Example A5 have a step of oxidizing the surface of alloy powders at the time of grinding and at the time of drying, respectively.

It is considered that for the above reasons the unavoidable segregation phase portions of the alloy surface were locally oxidized and became difficult to be etched at the subsequent acid treatment.

Although it is impossible to say absolutely since designing conditions of batteries and required performances are not uniform, in order to obtain the higher high-rate discharge characteristics, it is preferred that wet grinding in water is employed as a grinding method and a drying step is not included between the alkali treatment and the acid treatment.

Example 2

The difference of battery characteristics due to the difference in specific surface area of the hydrogen-absorbing alloy was evaluated. Hydrogen-absorbing alloy powders differing in specific surface area of the alloy measured by BET method were obtained by carrying out grinding and alkali treatment under the same conditions as in example A1, then carrying out the acid treatment with changing the pH to 1.0, 1.5, 2.0, 2.5, 3.0, 3.5 and 4.0, and further carrying out washing with water. Then, sealed nickel-metal hydride storage batteries were made in the same manner as in Example A1 to obtain seven batteries of Examples C1–C7. These batteries were subjected to the same battery tests as in Example 1. The results are shown in Table 2.

TABLE 2

|    | pH at the acid treatment | Specific surface area (m$^2$/g) | Internal pressure (kg/cm$^2$) | High-rate discharge characteristics | |
|----|----|----|----|----|----|
|    |    |    |    | Discharge voltage (V) | Discharge capacity ratio (%) |
| C1 | 1.0 | 0.43 | 8.2 | 1.120 | 82 |
| C2 | 1.5 | 0.44 | 7.3 | 1.121 | 85 |
| C3 | 2.0 | 0.50 | 5.3 | 1.128 | 93 |
| C4 | 2.5 | 0.55 | 4.7 | 1.130 | 95 |
| C5 (Same as A1) | 3.0 | 0.62 | 4.3 | 1.126 | 94 |
| C6 | 3.5 | 0.65 | 4.8 | 1.128 | 92 |
| C7 | 4.0 | 0.46 | 7.8 | 1.118 | 86 |

It can be seen from the results shown in Table 2 that the hydrogen-absorbing alloy of the larger specific surface area provided the lower internal pressure and the superior high-rate discharge characteristics.

As a result of various analyses, it is presumed that in Examples C3–C6 in which the specific surface area was large, namely, pH of the acid treating solution was in the range of 2.0–3.5, the hydroxide of the rare earth element on the surface of the alloy was removed and the alloy surface had a structure of the nickel-condensed layer being exposed effectively and had many pores of 1.5–2.0 nm in pore diameter, whereby the resistance to the electrochemical reaction on the alloy surface was lowered.

However, when pH was low and high, the performances were improved than in Comparative Example B1, but the effect was small.

In Examples C1 and C2 where pH was low, the hydroxide of the rare earth element on the alloy surface was removed, but since all the elements in the alloy can be dissolved, the segregation phase portions of the rare earth element were not be selectively etched, but wholly etched and, hence, pores were not sufficiently formed on the alloy surface to result in decrease of the specific surface area.

Furthermore, it is presumed that in Example C7 where pH was high, removal of the hydroxide of the rare earth element and formation of the pores were insufficient and the effect of the acid treatment was small. From the above results, the optimum pH range in the acid treatment was 2.0–3.5.

Example 3

In order to evaluate the difference of battery characteristics due to the difference in the content of magnetic material in terms of nickel in the hydrogen-absorbing alloy, sealed nickel-metal hydride storage batteries were made in the same manner as in Example 1.

A hydrogen-absorbing alloy which was ground and subjected to the alkali treatment in the same manner as in Example 1 was washed with water, then subjected to the acid treatment with an aqueous acetic acid solution of pH 3.0 at 30° C., and further washed with water. A battery was made using the resulting alloy powders. This was a battery of Example D1.

In the same manner as above, alloy powders were obtained by the grinding and alkali treatment, and washed with water, treated with changing the treating temperature with acetic acid to 40, 55, 70 and 80° C., and washed with water. Batteries were made using the resulting alloy powders. These were batteries of Examples D2–D5.

The batteries of Examples D1–D5 obtained by the above methods were evaluated on the high-rate discharge characteristics. The results are shown in Table 3.

TABLE 3

| | Acetic acid treating temperature (° C.) | Content of magnetic material (wt %) | High-rate discharge performances | |
|---|---|---|---|---|
| | | | High-rate discharge voltage (V) | High-rate discharge capacity ratio (%) |
| D1 | 30 | 1.8 | 1.122 | 93 |
| D2 | 40 | 2.0 | 1.128 | 93 |
| D3 | 55 | 3.5 | 1.130 | 95 |
| D4 | 70 | 5.0 | 1.127 | 94 |
| D5 | 80 | 7.0 | 1.127 | 90 |

As can be seen from the results shown in Table 3, the batteries of Examples D1–D5 in which the hydrogen-absorbing alloy powders were subjected to the acid treatment after the alkali treatment were improved in the high-rate discharge performance as compared with the battery of Comparative Example B1.

It can be considered that this is because the insulating hydroxide of the rare earth element precipitated on the alloy surface after the alkali treatment was removed by the acid treatment to result in the effect of improving electrical conductivity between the alloy particles and the effect of lowering the resistance to the reaction on the alloy surface.

In Examples D1–D5, with increase in the content of magnetic material in terms of nickel in the alloy, the high-rate discharge performance was improved and the alloy containing 1.8% by weight or more of magnetic material in terms of nickel was especially high in discharge voltage of the high-rate discharge characteristics and was satisfactory.

The battery as of Example D1 which was made using an alloy low in the content of magnetic material in terms of nickel was improved in performances than the battery of Comparative Example B1, but was lower in performances than the batteries of other Examples.

When the acid treatment of the hydrogen-absorbing alloy is carried out at a temperature lower than 30° C., the content of magnetic material in terms of nickel must be increased in view of prolongation of the time, etc. Thus, 30° C. or higher is desired from the points of industrial productivity and control of the treating temperature.

On the other hand, the battery as of Example D5 made using an alloy which was high in the content of magnetic material in terms of nickel was good in high-rate discharge voltage, but decreased in discharge capacity ratio.

It is presumed that this is because with increase in the content of magnetic material in terms of nickel, amount of hydrogen absorbed in the alloy decreases.

From the above, as for the high-rate discharge characteristics, the most preferred hydrogen-absorbing alloys are those which have a content of magnetic material of 2.0–5.0% by weight in terms of nickel and are acid treated at 40–70° C.

The conditions for the alkali treatment in preparation of the hydrogen-absorbing alloys were preferably 1.20–1.40 in specific gravity of the alkaline aqueous solution, 70–110° C. in treating temperature, and 30–120 minutes in treating time.

This alkali treatment is for dissolution and removal of soluble components in the alloy with an aqueous alkaline solution and formation of a nickel-condensed layer resulting therefrom. Under the conditions of the higher concentration of the aqueous alkaline solution, the higher temperature and the longer time, the soluble components are more effectively dissolved and removed and the nickel-condensed layer is more easily formed, and the initial activity and the high-rate charge and discharge characteristics are improved, but the amount of hydrogen of the alloy absorbed and released decreases. Thus, the above ranges are preferred.

In this example, the surface treatment of the hydrogen-absorbing alloy was carried out by treating with an aqueous alkaline solution and thereafter with an acidic aqueous solution. The alkali treatment can be carried out with an aqueous alkaline solution comprising sodium or lithium other than potassium, and the acid treatment can be carried out with an acidic buffer solution such as acetic acid/sodium acetate to obtain the similar effects.

What is claimed is:

1. A method for producing a hydrogen-absorbing alloy electrode, the hydrogen-absorbing alloy comprising hydrogen-absorbing alloy powders, the method comprising:

a grinding step of grinding a hydrogen-absorbing alloy comprising at least one rare earth element, nickel and at least one transition metal element to produce said hydrogen-absorbing alloy powders, wherein surface portions of the hydrogen-absorbing alloy powders have an exposed nickel-condensed layer and are porous, and the content of the pores having a pore diameter of 1.5–2.0 nm in the surface portion of the alloy powders is $1.5 \times 10^{-3}$ to $4.0 \times 10^{-3}$ cc per 1 g of the alloy powders;

a first treating step of treating the hydrogen-absorbing alloy powders with an alkaline aqueous solution;

a second treating step of treating the hydrogen-absorbing alloy powders with an acidic aqueous solution in which the grinding step is wet grinding and the second treating step is carried out in succession to the first treating step, wherein the second treating step follows the first treating step, and the first treating step follows the grinding step; and forming a hydrogen-absorbing alloy electrode having said hydrogen-absorbing alloy powders therein.

2. A method for producing a hydrogen-absorbing alloy electrode according to claim 1, wherein the alkaline aqueous solution has a specific gravity of 1.20–1.40 and the treatment with the alkaline aqueous solution is carried out at a temperature of 70–110° C. for 30–120 minutes.

3. A method for producing a hydrogen-absorbing alloy electrode according to claim 1, wherein the acidic aqueous solution has a pH of 2.0–3.5 and the treatment with the acidic aqueous solution is carried out at a temperature of 30–80° C.

4. A method for producing a hydrogen-absorbing alloy electrode according to claim 1, wherein the acidic aqueous solution has a pH of 2.0–3.5 and the treatment with the acidic aqueous solution is carried out at a temperature of 40–70° C.

5. A method for producing a hydrogen-absorbing alloy electrode according to claim 1, which further comprises a fourth step of adjusting pH of slurry of the alloy powders of the third step to 7–13 by adding thereto an alkaline aqueous solution.

6. A method for producing a hydrogen-absorbing alloy electrode according to claim 5, wherein the alkaline aqueous solution used at the second step has a specific gravity of 1.20–1.40 and the treatment with the alkaline aqueous solution is carried out at a temperature of 70–110° C. for 30–120 minutes.

7. A method for producing a hydrogen-absorbing alloy electrode according to claim 5, wherein the acidic aqueous solution has a pH of 2.0–3.5 and the treatment with the acidic aqueous solution is carried out at a temperature of 30–80° C.

8. A method for producing a hydrogen-absorbing alloy electrode according to claim 5, wherein the acidic aqueous solution has a pH of 2.0–3.5 and the treatment with the acidic aqueous solution is carried out at a temperature of 40–70° C.

* * * * *